United States Patent
Xie et al.

(10) Patent No.: US 8,496,901 B2
(45) Date of Patent: Jul. 30, 2013

(54) PREPARATION METHOD FOR A WATER-INSOLUBLE CRYSTAL FORM II AMMONIUM POLYPHOSPHATE WITH HIGH PURITY AND POLYMERIZATION DEGREES

(75) Inventors: Sizheng Xie, Qingyuan (CN); Ken Zhou, Qingyuan (CN)

(73) Assignee: Presafer (Qingyuan) Phosphor Chemical Company Limited, Guangdong (CN)

( * ) Notice: Subject to any disclaimer, the term of this patent is extended or adjusted under 35 U.S.C. 154(b) by 28 days.

(21) Appl. No.: 13/397,351

(22) Filed: Feb. 15, 2012

(65) Prior Publication Data

US 2012/0207660 A1      Aug. 16, 2012

(30) Foreign Application Priority Data

Feb. 16, 2011    (CN) .......................... 2011 1 0038999

(51) Int. Cl.
*C01B 25/26*   (2006.01)
*C01B 25/44*   (2006.01)

(52) U.S. Cl.
USPC ............................ 423/305; 423/314; 423/315

(58) Field of Classification Search
USPC .................. 423/302, 304–315; 252/601–611
See application file for complete search history.

(56) References Cited

U.S. PATENT DOCUMENTS 3,034,860 A * 5/1962 McCollough, Jr. ............ 423/304
5,165,904 A * 11/1992 Staffel et al. .................. 423/305
5,718,875 A * 2/1998 Watanabe ..................... 423/305

* cited by examiner

*Primary Examiner* — Steven Bos
*Assistant Examiner* — Justin Bova
(74) *Attorney, Agent, or Firm* — R. Neil Sudol; Coleman Sudol Sapone, P.C.

(57) ABSTRACT

A preparation method for a water-insoluble crystal form ammonium polyphosphate includes conveying crystal H-type phosphorus pentoxide and diammonium phosphate at a molar ratio of 1:1-1.5 into a malaxator with twin screws, and injecting ammonia gas for 3-40 minutes into the malaxator at 20-25 $m^3/h$ while preheating the material at a temperature between 100° C. and 300° C. Therafter one injects ammonia gas again at 8-15 $m^3/h$ for 4-8 hours. The resulting material is transferred to another sealed container and stirred while coupling agent is added. Stirring continues until the material drops below 60° C., the material then being transferred into organic solvent for washing for 30-50 minutes. Thereafter the material is first filter pressed, then subjected to low temperature drying, and then sieved to obtain the final product.

3 Claims, 4 Drawing Sheets

PREPARATION METHOD FOR A WATER-INSOLUBLE CRYSTAL FORM II AMMONIUM POLYPHOSPHATE WITH HIGH PURITY AND POLYMERIZATION DEGREES

TECHNICAL FIELD

The present invention discloses a preparation method for a water-insoluble crystal form II ammonium polyphosphate with high purity and polymerization degrees.

BACKGROUND ART

Ammonium polyphosphate (APP) is a kind of high-efficiency and environment-friendly flame retardants with high phosphor and nitrogen contents. It has different crystal types including crystal type I, II, III, IV, and V.

Among them, APP of crystal type II performs the best in thermal stability and water resistance so that it can be widely used in different fields, such as in plastic, fabric, leather, high-grade fire retardant coating, rubber paper, wood, fiber and so on. Its characteristics of low toxicity, none drippage and low smog make it be a good substitute for the halogen flame retardants.

At present, phosphorus pentoxide and diammonium hydrogen phosphate are used as raw materials to synthesize ammonium polyphosphate. The polymerization degree synthesized may be low resulting from various causes, such as the stoichiometric ratio of the reactants, the purity and activity of the reactants, incomplete ammonification reaction during the entire process, etc. Meanwhile, for the product, no protective treatment after discharging from the high temperature reactor kettle will lead to that the ammonium polyphosphate may have chain scission. Besides, the ammonium polyphosphate produced according to the conventional methods contains relatively more low molecular pre-polymer, and thus has worse water resistance and lower initial decomposition temperature.

SUMMARY OF THE INVENTION

The aim of the invention is to provide a method for synthesizing a water-insoluble ammonium polyphosphate of crystal structure form II, having high purity and polymerization degrees.

The technical Solution of the invention could be:

A preparation method for a water-insoluble crystal form II ammonium polyphosphate with high purity and polymerization degree, comprising the following steps:
1) conveying crystal type-H phosphorus pentoxide and diammonium phosphate at a molar ratio of 1:1-1.5 into a malaxator with twin screw, and injecting ammonia gas into the malaxator at 20-25 m³/h while preheating the material at a temperature between 100° C. and 300° C.;
2) after injecting ammonia gas for 30-40 minutes, stopping to add ammonia supplying compound to the malaxator, and then injecting ammonia gas into the malaxator again at 8-15 m³/h for 4-8 hours, wherein the weight ratio of the crystal H-type phosphorus pentoxide and ammoniate is 1:0.01-0.05;
3) transferring the material of step 2 to another sealed container with stirring function, and adding coupling agent in when stirring, wherein the weight ratio of the crystal H-type phosphorus pentoxide and the coupling agent is 1:0.01-0.05;
4) keeping stirring until the temperature of the material drops below 60° C., and then transferring the material into organic solvent for washing for 30-50 mins;
5) transferring the material of step 4 to a filter press for filter-pressing, after that putting the material into a low temperature drying oven for drying, and then sieving the material to obtain the final product.
   wherein, the ammonia supplying compound is at least one of ammonium carbonate, biuret, semicarbazide and dicyandiamide sulfate.

The organic solvent is at least one of acetone, ethanol, methanol, toluene and xylene.

The coupling agent is at least one of silane coupling agent, aluminate coupling agent, titanate coupling agent and phosphate coupling agent.

The beneficial effects of the invention could be: this invention can achieve an ammonium polyphosphate with high polymerization degree, good water resistance, high initial decomposition temperature, little oligomer content and greatly reduced impurity peaks.

DETAILED DESCRIPTION EMBODIMENTS

The preparation method for a crystal form II water-insoluble ammonium polyphosphate with high purity and polymerization degrees, comprising the following steps:
1) Conveying the crystal H-type phosphorus pentoxide and diammonium hydrogen phosphate (DAP) at a molar ratio of 1:1-1.5 into the malaxator with twin screw, preheating the materials at a temperature between 100° C. and 300° C., and filling the malaxator with ammonia at 20-25 m³/h during preheating.
2) After filling the malaxator with ammonia gas for 30-40 minutes, stopping to add ammonia supplying compound into the malaxator, and then filling the malaxator with ammonia gas again at 8-15 m³/h for 4-8 hours.
3) Transferring the material of step 2 to another sealed container with stirring function, and adding the coupling agent in when stirring the materials.
4) Keeping stirring until the material temperature drops below 60° C., and then transferring the material to organic solvent for washing for 30-50 minutes.
5) Transferring the material of step 4 to a filter press for filter pressing, and then putting the material into a low temperature drying oven for drying, after that sieving the material to obtain the finished product. The mesh number of the sieve herein is between 1000 and 3000.

Figure 1:
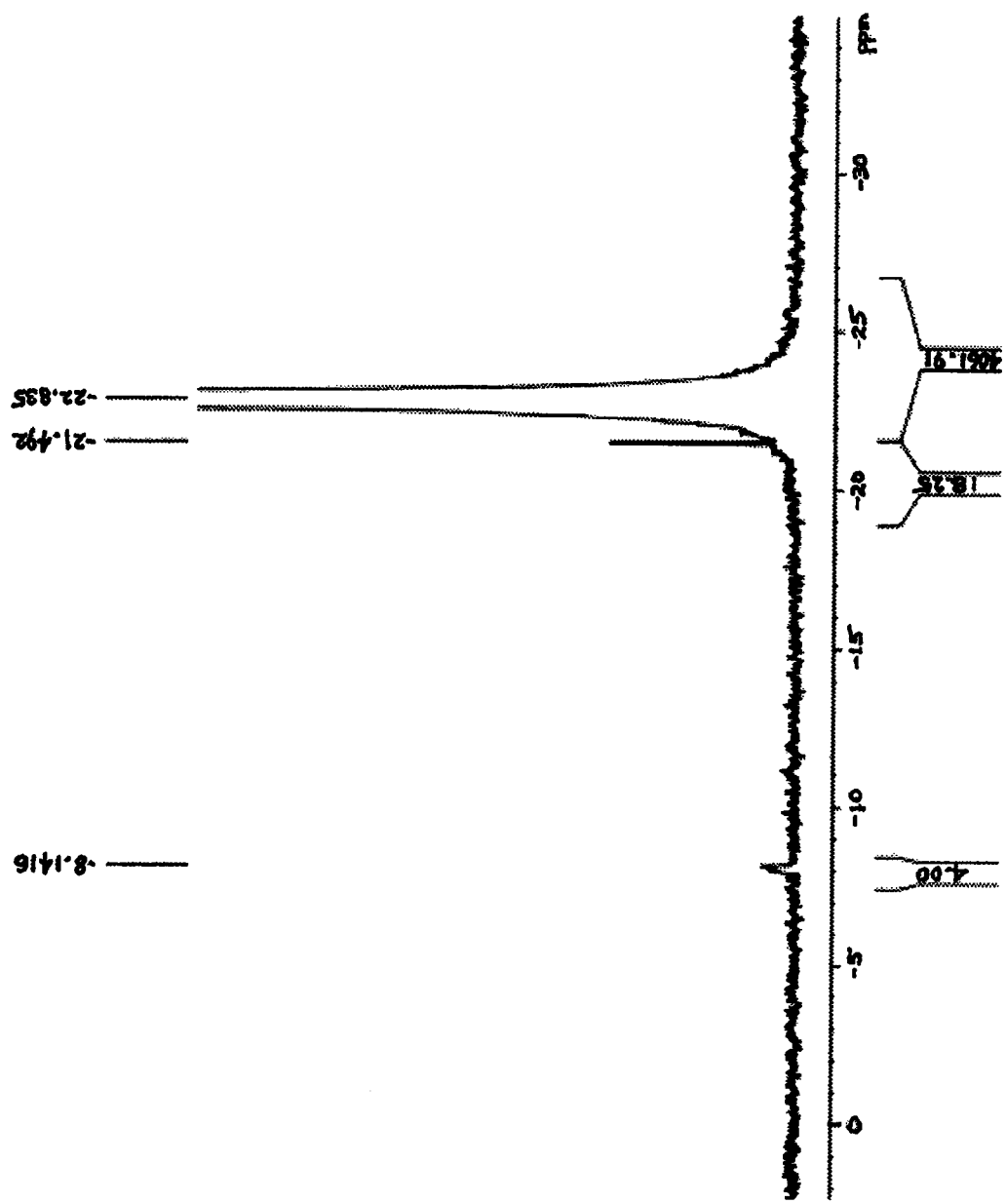
FIG. 1 and FIG. 2 are graphs showing spectra of a product made in accordance using a process in accordance with the present invention.
Figure 2:
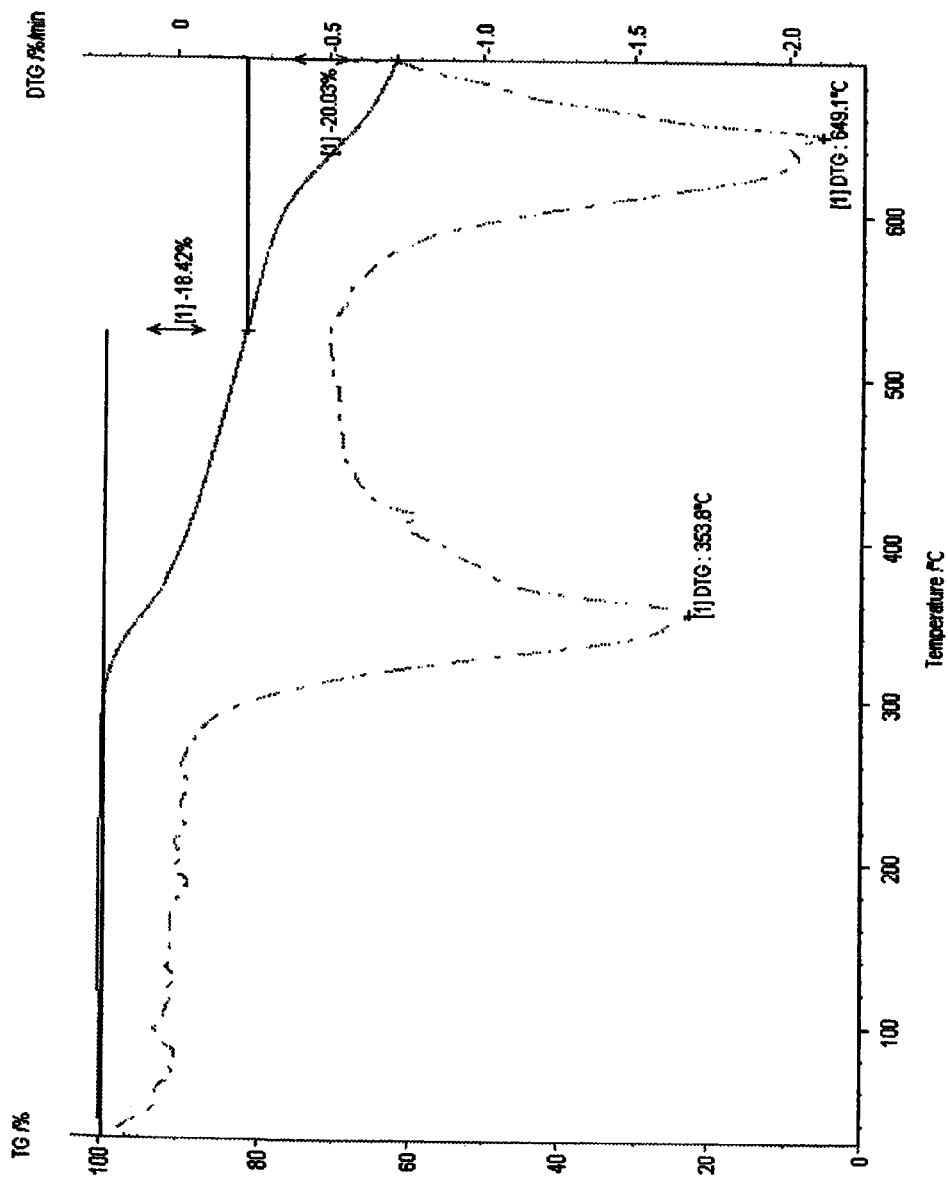

The sealed container with stirring function in step 3 may be a rake dryer. The ammonia supplying compound is at least one of ammonium carbonate, biuret, semicarbazide and dicyandiamide sulfate. The organic solvent is at least one of acetone, ethanol, methanol, toluene and xylene. The coupling agent is at least one of silane coupling agent, aluminate coupling agent, titanate coupling agent or phosphate coupling agent. Wherein the silane coupling agent comprises KH550, KH560, KH570, KH792, DL602, and DL171; the aluminate coupling agent comprises DN-828, and ZD-822; the titanate coupling agent comprises TG-2, TG-3, TG-27, TG-38S, TG-10, TG-S, and TG-200S; the phosphate coupling agent comprises TM-48, and DN-27. All the coupling agents could be bought from the market. The ratio of the crystal H-type phosphorus pentoxide in step 1 and the organic solvent in step 4 is 1 mol:12 L. Further details and advantages of the present invention are explained using the following embodiments, with reference to the drawings:

Embodiment 1:
1) Conveying 800 mol crystal H-type phosphorus pentoxide and 800 mol diammonium hydrogen phosphate(DAP)into the malaxator with twin screw, preheating the materials at 180-190° C., and filling the malaxator with ammonia gas at 20 m$^3$/h during preheating.
2) After filling the malaxator with ammonia gas for 30-40 mins, stopping to add 10.5 mol ammonium carbonate into the malaxator, and then injecting ammonia gas into the malaxator again at 8 m$^3$/h for 4 hours.
3) Transferring the material of step 2 to a 500 L rake dryer, and spraying 8 mol KH550 to the material during stirring.
4) Keeping stirring until the temperature of the material drops below 60° C., and then transferring the material to an enamel reactor with 1000 L ethanol for washing for 30 mins.
5) Transferring the material of step 4 to the filter press for filter pressing, putting the material into the low temperature drying oven for drying at 100° C. until a constant weight is achieved, and then sieving the material with a 1000 mesh sieve to obtain the finished product. (FIGS. 1 and 2 show the spectrums of the finished product)

Implement 2:
1) Conveying 880 mol crystal H-type phosphorus pentoxide and 880 mol diammonium hydrogen phosphate (DAP) to the malaxator with twin screw, preheating the material at a temperature between 160° C. and 170° C., and filling the malaxator with ammonia gas at 22 m$^3$/h during preheating.
2) After filling the malaxator with ammonia for 30-40 mins, stopping to add 10.5 mol dicyandiamide sulfate to the malaxator, refilling the malaxator with ammonia gas at 9 m$^3$/h for 4.5 h.
3) Transferring the material of step 2 to the 500 L rake dryer and spraying 9 mol titanate coupling agent TG-2 to the material while stirring.
4) Keeping stirring until the material temperature drops below 60° C., and then transferring the material to the enamel reactor with 1000 L acetone for washing for 30 mins.
5) Transferring the material of step 4 to the filter press for filter pressing, putting the material into the low temperature drying oven for drying at 110° C. until the constant weight is achieved, and then sieving the material with a 3000 mesh sieve and thus the finished product is obtained.

Implement 3:
1) Conveying 910 mol crystal H-type phosphorus pentoxide and 910 mol diammonium hydrogen phosphate (DAP) to the malaxator with twin screw, preheating the material at a temperature between 190° C. and 200° C. and filling the malaxator with ammonia gas at 25 m$^3$/h during preheating.
2) After filling the malaxator with ammonia for 30-40 mins, stopping to add 10.5 mol semicarbazide to the malaxator, and filling the malaxator again with ammonia gas at 10 m$^3$/h for 5 h.
3) Transferring the material of step 2 to the 500 L rake dryer and spraying 10 mol phosphate coupling agent DN-27 to the material while stirring.
4) Keeping stirring until the material temperature drops below 60° C., and then transferring the material to the enamel reactor with 1000 L methanol for washing for 50 mins.
5) Transferring the material of step 4 to the filter press for filter pressing, putting the material into the low temperature drying oven for drying at 120° C. until the constant weight achieved, and then sieving the material with a 2000 mesh sieve to obtain the finished product.

Implement 4:
1) Conveying 800 mol crystal H-type phosphorus pentoxide and 1200 mol diammonium hydrogen phosphate (DAP) to the malaxator with twin screw, preheating the material at a temperature between 290° C. and 300° C. and filling the malaxator with ammonia gas at 23 m$^3$/h while preheating.
2) After filling the malaxator with ammonia for 30-40 mins, stopping to add 40 mol biuret to the malaxator, and then filling the malaxator with ammonia gas again at 15 m$^3$/h for 8 h.
3) Transferring the material of step 2 to the 500 L rake dryer and spraying 40 mol phosphate coupling agent DN-27 to the material while stirring.
4) Keeping stirring until the temperature of the material drops below 60° C., and then transferring the material to the enamel reactor with 800 L xylene for washing for 40 mins.
5) Transferring the material of step 4 to the filter press for filter pressing, and then putting the material into the low temperature drying oven for drying at 120° C. until the constant weight is achieved, after that sieving the material with a 3000 mesh sieve to obtain the finished product.

Implement 5:
1) Conveying 800 mol crystal H-type phosphorus pentoxide and 850 mol diammonium hydrogen phosphate (DAP) to the malaxator with twin screw, preheating the material at a temperature between 290° C. and 300° C. and filling the malaxator with ammonia gas at 23 m$^3$/h during preheating.
2) After filling the malaxator with ammonia gas for 30-40 mins, stopping to add 8 mol biuret to the malaxator, and then filling the malaxator with ammonia gas again at 12 m$^3$/h for 5 h.
3) Transferring the material of step 2 to the 500 L rake dryer and spraying 16 mol titanate coupling agent TG-27 to the material while stirring.
4) Keeping stirring until the temperature of the material drops below 60° C., and then transferring the material to the enamel reactor with 1600 L xylene to wash for 40 mins.
5) Transferring the material of step 4 to the filter press for filter pressing, and putting the material into the low temperature drying oven for drying at 120° C. until the constant weight is achieved, after that sieving the material with a 3000 mesh sieve to obtain the finished product.

Implement 6:
1) Conveying 900 mol crystal H-type phosphorus pentoxide and 900 mol diammonium hydrogen phosphate (DAP) to the malaxator with twin screw, preheating the material at a temperature between 100° C. and 110° C. and filling the malaxator with ammonia gas at 25 m$^3$/h during preheating.
2) After filling the malaxator with ammonia gas for 30-40 mins, stopping to add 18 mol semicarbazide to the malaxator, and then filling the malaxator with ammonia gas again at 15 m$^3$/h for 6 h.
3) Transferring the material of step 2 to the 500 L rake dryer and spraying 22.5 mol titanate coupling agent TG-27 to the material while stirring.

4) Keeping stirring until the material temperature drops below 60° C., and then transferring the material to the enamel reactor with 1000 L xylene to wash for 50 mins.
5) Transferring the material of step 4 to the filter press for filter pressing, and then putting the material into the low temperature drying oven for drying at 120° C. until the constant weight is achieved, after that sieving the material with a 2000 mesh sieve to obtain the finished product.

Figure 3:
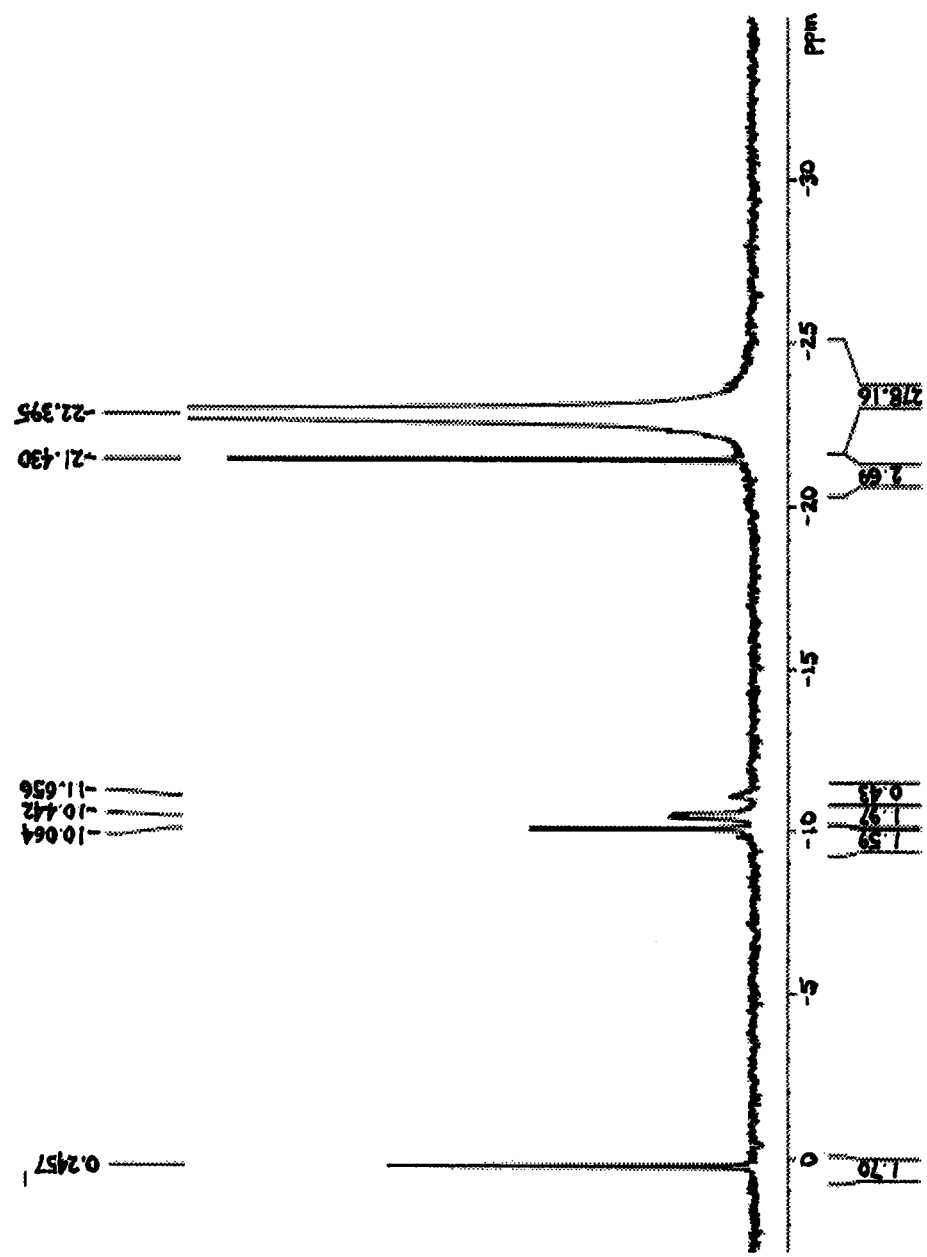
FIG. 3 and FIG. 4 are graphs showing spectra of a product made in accordance using another process in accordance with the present invention.
Figure 4:
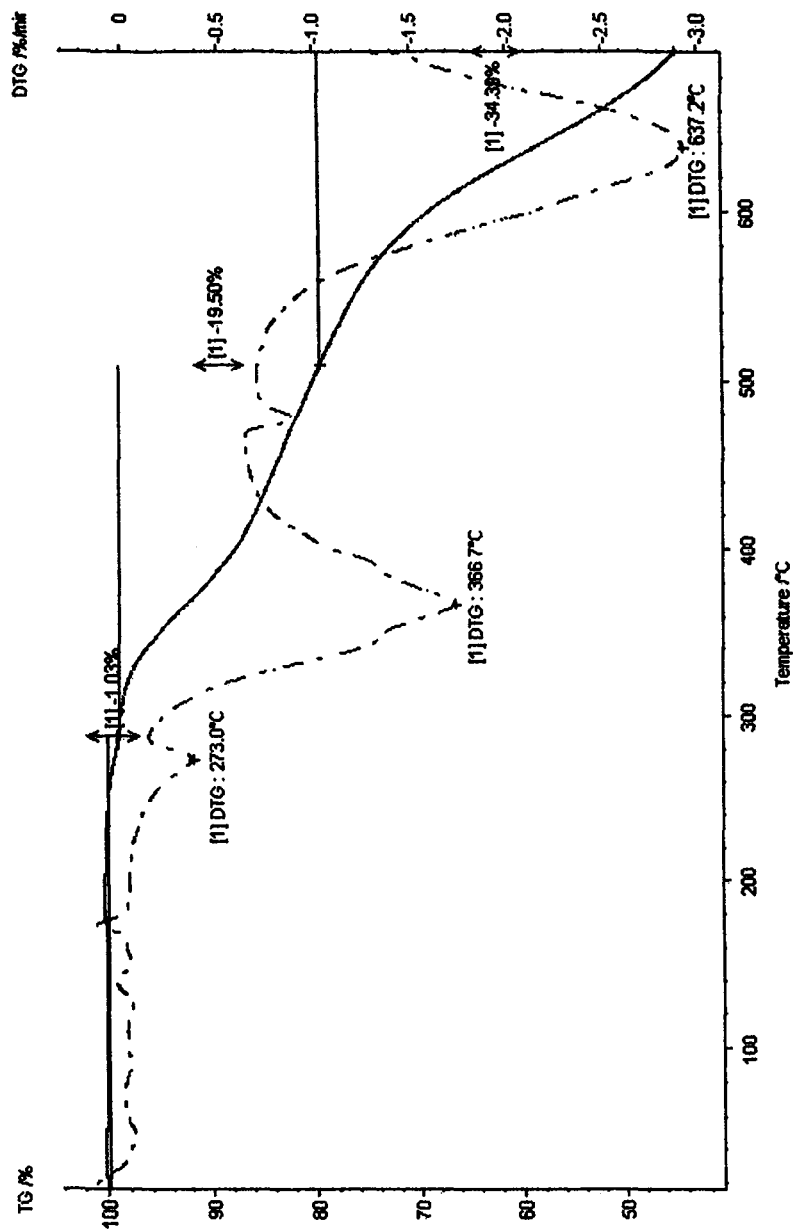

Comparison 1:
1) Conveying 910 mol crystal H-type phosphorus pentoxide and 910 mol diammonium hydrogen phosphate(DAP)into the malaxator with twin screw, preheating the material at 190-200° C. and filling the malaxator with ammonia gas at 25 $m^3/h$ during preheating.
2) After filling the malaxator with ammonia for 30-40 mins, stopping to add 10.5 mol semicarbazide to the malaxator, and then filling the malaxator with ammonia gas again at 10 $m^3/h$ for 5 h.
3) Spraying 10 mol phosphate coupling agent DN-27 to the material while stirring.
4) Sieving the material with a 1000 mesh sieve to obtain the finished product. (FIGS. 3 and 4 show the spectrums of the finished product)

Comparison 2:
1) Conveying 880 mol crystal H-type phosphorus pentoxide and 880 mol diammonium hydrogen phosphate (DAP) into the malaxator with twin screw, and then preheating the material at a temperature between 190° C. and 200° C. and filling the malaxator with ammonia gas at 22 $m^3/h$ during preheating.
2) After filling the malaxator with ammonia gas for 30-40 mins, stopping to add 10.5 mol semicarbazide to the malaxator, and filling the malaxator with ammonia gas again at 9 $m^3/h$ for 4.5 h.
3) Spraying 9 mol phosphate coupling agent DN-27 to the material while stirring.
4) Sieving the material with a 3000 mesh sieve to obtain the finished product.

The polymerization degree, water solubility, initial decomposition temperature and the oligomer content of the finished product respectively achieved in Implementation 1~3 and Comparison 1 and 2 are listed in the following sheet 1:

Sheet 1: Product Property

| Test Item | Embodiment 1 | Embodiment 2 | Embodiment 3 | Comparison 1 | Comparison 2 |
|---|---|---|---|---|---|
| W99ater Solubility | ≦0.05% | ≦0.08% | ≦0.1% | ≦0.5% | ≦0.4% |
| Initial Decomposition Temperature | ≧301° C. | ≧299° C. | ≧295° C. | ≧270° C. | ≧265° C. |
| Oligomer Content | 0 | 0 | 0 | 0.61% | 0.67% |
| Polymerization Degree | 2008 | 1532 | 1415 | 139 | 121 |

It can be concluded from Sheet 1 that the present invention can achieve an ammonium polyphosphate of high polymerization degree, good water resistance, high initial decomposition temperature, little oligomer content and significantly reduced impurity peaks.

The invention claimed is:

1. A preparation method for a water-insoluble crystal form II ammonium polyphosphate with high purity and polymerization degrees comprising the following steps:
1) conveying crystal H-type phosphorus pentoxide and diammonium phosphate at a molar ratio of 1:1-1.5 into a malaxator with twin screw, and injecting ammonia gas into the malaxator at 20-25 $m^3/h$ while preheating the phosphorus pentoxide and diammonium phosphate in the malaxator at a temperature between 100° C. and 300° C.;
2) after injecting ammonia gas for 30-40 minutes, stopping to add ammonia supplying compound to the malaxator, and then injecting ammonia gas into the malaxator again at 8-15 $m^3/h$ for 4-8 hours, wherein the weight ratio of the crystal H-type phosphorus pentoxide and ammonia supplying compound is 1:0.01-0.05;
3) transferring the malaxator contents resulting from step 2 into a sealed container with stirring function, and adding coupling agent while stirring to form a mixture, wherein the weight ratio of the crystal H-type phosphorus pentoxide and the coupling agent is 1:0.01-0.05;
4) continuing to stir until the temperature of the mixture in the sealed container drops below 60° C., and then transferring the mixture into organic solvent for washing for 30-50 mins to form washed materials;
5) transferring the washed materials of step 4 to a filter press for filter-pressing to obtain filter-pressed materials, thereafter putting the filter-pressed materials into a low temperature drying oven for drying thereby forming dried materials, and then sieving the dried materials to obtain the crystal form II ammonium polyphosphate,
wherein, the ammonia supplying compound is at least one selected from the group consisting of ammonium carbonate, biuret, semicarbazide and dicyandiamide sulfate.

2. The method according to the claim 1, wherein the organic solvent is at least one selected from the group consisting of acetone, ethanol, methanol, toluene and xylene.

3. The method according to the claim 1, wherein the coupling agent is at least one selected from the group consisting of silane coupling agent, aluminate coupling agent, titanate coupling agent and phosphate coupling agent.

* * * * *